United States Patent [19]
Ehlert

[11] 3,960,091
[45] June 1, 1976

[54] ROPE HOOK MOUNT FOR A VEHICLE OR THE LIKE

[76] Inventor: Delbert D. Ehlert, P.O. Box 762, Grass Valley, Calif. 95945

[22] Filed: Nov. 1, 1974

[21] Appl. No.: 519,927

Related U.S. Application Data

[63] Continuation of Ser. No. 257,160, May 26, 1972, abandoned.

[52] U.S. Cl. .............................. 105/475; 24/265 CD; 105/469; 105/483
[51] Int. Cl.² ...................... B60P 7/08; B61D 45/00
[58] Field of Search .......... 105/473, 475, 480, 481, 105/483, 469; 280/179.1; 24/115J, 123 H, 129 R, 230 AM, 265 CD

[56] References Cited
UNITED STATES PATENTS

| | | | |
|---|---|---|---|
| 2,623,477 | 12/1952 | Tuttle | 105/483 |
| 2,753,816 | 7/1956 | Oakley | 105/480 |
| 2,876,729 | 3/1959 | Georgette | 105/475 |
| 3,334,914 | 8/1967 | Vierregger | 105/483 |
| 3,694,866 | 10/1972 | Maier | 24/115 J |

Primary Examiner—Drayton E. Hoffman
Attorney, Agent, or Firm—Phillips, Moore, Weissenberger Lempio & Strabala

[57] ABSTRACT

A rope hook mount for attachment to the body of a vehicle is described as having a mounting flange with a face conforming generally to the contour of the portion of the body of the vehicle upon which the mount is to be secured. The flange includes a raised portion integral therewith and extending outtwardly away from the face of the flange. An aperture is formed in the raised portion and an elongated lip member extends inwardly from the raised portion toward the aperture. The lip member has an outer surface which is generally flush with the outer surface of the raised portion and an inner surface spaced from the face of the flange so that a rope or the like may be looped around the lip member and retained in position by both the lip member and the walls of the aperture.

1 Claim, 4 Drawing Figures

U.S. Patent   June 1, 1976   3,960,091
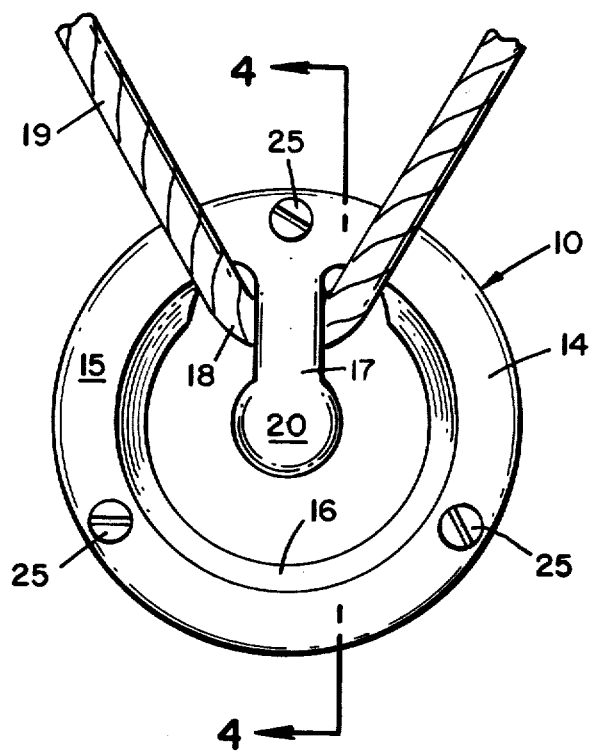
FIG_1
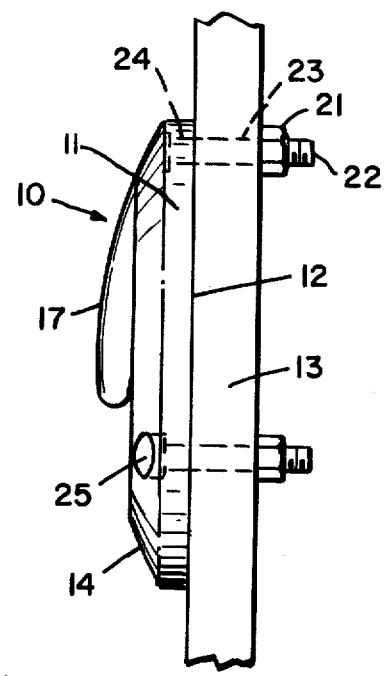
FIG_2
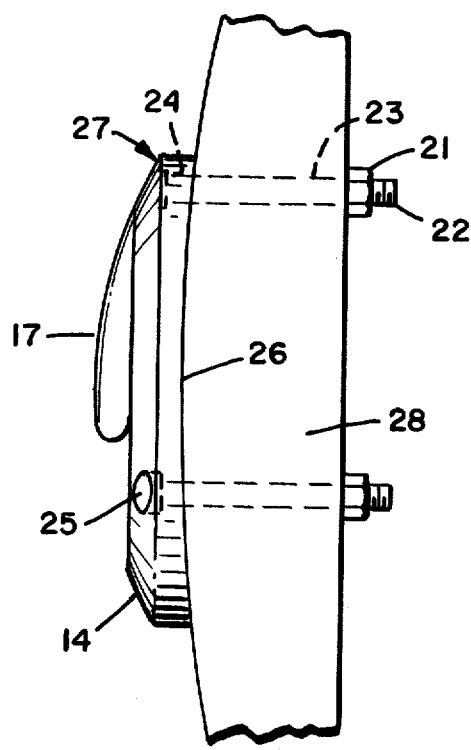
FIG_3
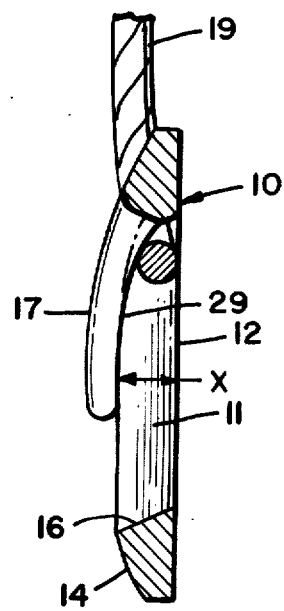
FIG_4

3,960,091

ROPE HOOK MOUNT FOR A VEHICLE OR THE LIKE

This is a continuation of Ser. No. 257,160, filed May 26, 1972, now abandoned.

BACKGROUND OF THE INVENTION

1. Field of the Invention

The invention relates to rope mounts; and, more particularly, to a rope hook mount which can be secured flush to the body of a vehicle or the like.

2. Description of the Prior Art

It has been suggested to secure cargo or the like carried by a vehicle by the use of chains, ropes, cables, etc. The free ends of such ropes or the like are then secured to one or more mounts which may be mounted on opposite sides of the vehicle. One such mount is described in U.S. Pat. No. 3,257,971 to Swendsen. Although such a mount is satisfactory for its intended purpose, that is, is mounted in a manner whereby the surfaces thereof do not protrude from the surface of the vehicle, thus avoiding the possibility of injury to both workmen and cargo, a relatively large opening must be formed in the vehicle body to provide for installation thereof. The necessity for such openings is undesirable since, in addition to the cost and labor required to make such openings, the user thereof is faced with one or more large openings in his vehicle body should he later decide that there is no longer need for such a mount. In other words, the mount of Swendsen requires that large holes be made in the vehicle body to receive the concave wall of his mount, leaving such holes upon later removal thereof.

There is thus a need for an essentially non-protruding rope hook mount which can be quickly and easily mounted on a vehicle and leave no large holes or the like upon later removal thereof.

SUMMARY OF THE INVENTION

It is an object of this invention to provide an essentially non-protruding rope hook mount for a vehicle or the like which can be easily and quickly mounted at any desired position on the body thereof.

It is a further object of this invention to provide such a mount without the necessity of previously forming large holes in the body of the vehicle, which holes would remain therein upon subsequent removal of the mount.

It is a still further object of this invention to provide such a mount which conforms generally to the contour of the vehicle body.

These and other objects are preferably accomplished by providing a mounting flange having a face conforming generally to the contour of the portion of the body of the vehicle upon which the mount is to be secured. The flange includes a raised portion integral therewith and having an outer surface forming part of a smoothly convex surface extending outwardly away from the face of the flange. An aperture of inwardly decreasing diameter is formed in the raised portion and an elongated lip member extends from the raised portion over the aperture. The lip member has an outer surface which is generally parallel with the outwardly convex surface of which the outer surface of the raised portion forms a part and an inner surface spaced from the face of the flange so that a rope or the like may be looped around the lip member and retained in position by both the lip member and the walls of the aperture.

BRIEF DESCRIPTION OF THE DRAWINGS

FIG. 1 is a front view of a rope hook mount in accordance with the teachings of my invention, showing a rope hooked therearound;

FIG. 2 is a side view of the mount of FIG. 1 mounted on a vehicle body;

FIG. 3 is a view similar to FIG. 2 showing a modification thereof; and

FIG. 4 is a view of the mount of FIG. 1 taken along lines 4—4.

DESCRIPTION OF THE PREFERRED EMBODIMENT

Referring to FIG. 1 of the drawing, a rope hook mount 10 is shown which is preferably generally circular in outer configuration. Of course, mount 10 may be of any desired configuration. Mount 10 includes a flange portion 11 (FIG. 2) having a generally flat surface or face 12 for mounting the flange portion 11 directly to and flush with a generally flat portion 13 of the body of a vehicle or the like (not shown). The vehicle may be of any type, such as a pick-up truck, boat, etc. The portion 13 may be a fender, side panels, bed of a pick-up truck, etc. In any event, a raised portion 14 extends upwardly and outwardly from flange portion 11. Although raised portion 14 may be separable from flange portion 11, preferably both portions are of one integral piece. Raised portion 14 includes an outer surface 15 which, as can be seen in FIGS. 2 and 3, forms a portion of a surface which is outwardly convex so as to present a smooth, custom look to mount 10 that blends into the vehicle body portion 13. The dimensions of mount 10 are, of course, arbitrary. For example, the mount 10 may be about 3 inches or so in diameter with its thickest portion about five-eighths inch or so. Thus, the mount 10 does not protrude any appreciable distance out of the plane of body portion 13 and smoothly blends into the contours thereof.

As can be seen in FIG. 1, a central aperture 16 decreasing in diameter inwardly from the outer surface 15 of raised portion 14 preferably extends through both raised portion 14 and flange portion 11. Of course, for my purposes, aperture 16 need not be centrally located nor extend through flange portion 11 for reasons to be described. This aperture 16 is of a convenient minimum diameter for inserting the looped end of a rope or the like therein. For example, in the dimensions given hereinabove for the flange portion 11 and raised portion 14, aperture 16 may be about 2⅛ inches or so in diameter at the outer surface 15 of raised portion 14 decreasing inwardly to a minimum diameter of about 1⅞ inch.

An elongated lip member 17 (FIG. 1) extends from the outer surface 15 of raised portion 14 inwardly toward aperture 16 and has an outer surface which is generally parallel with the outwardly convex surface of which the outer surface 15 of raised portion 14 forms a part. The extent of lip member 17 is arbitrary as long as provision is made for the looped end 18 of rope 19. In other words, preferably a sufficient distance exists between the free end 20 of lip member 17 and the adjacent walls of aperture 16 to pass the looped end 18 of rope 19 into aperture 16 and about lip member 17. The free end 20 of lip member 17 is preferably enlarged as shown for preventing rope 19 from sliding back off of member 17 should stress thereon be released. Again, in the example given, lip member 17 may be about 1⅜ inches or so in overall length and about one-half inch or so in width, thus leaving a space three-fourths inch or so between free end 20 and the adjacent wall of aperture 16. Of course, any distance which is suitable for passing the looped end of a rope over end 20 may be used.

Nuts 21 and bolts 22 or any suitable means may be used to removably secure mount 10 to apertures 23 formed in vehicle body portion 13. Thus, the only holes necessary for the mount of my invention are one or more relatively small holes drilled or otherwise formed in body portion 13 which are aligned with one or more spaced apertures 24 in mount 10 through which bolts 22 extend. It should also be noted that the heads 25 of bolts 22, as can be seen in FIGS. 2 and 3, are preferably countersunk in the outer surface 15 of raised portion 14 for streamlining purposes.

As shown in FIG. 3, the face 26 of mount 27, which is identical in all other respects to mount 10 of FIGS. 1 and 2 and thus like numerals refer to like parts thereof, is slightly cylindrically concave, that is, having a cylindrical axis of curvature extending in a direction generally perpendicular to the lip member 17. Thus, the lip member 17, as shown, extends downwardly while mount 27 is curved, at face 26, in a direction conforming to the conventional downward and outward slightly convex curvature of the side panel or fender of the body of a vehicle. In other words, the rope 19 of FIG. 1 would pass about lip member 17 and extend upwardly with respect thereto. The radius of curvature is slight, as for example, about 12 to 14 inches or so. Thus, the mounts of FIGS. 2 and 3 would cover most of the areas of a vehicle or the like upon which it is desired to install.

It is not necessary that the aperture 16 extend through the face of the flange portion 11 which engages the body of the vehicle or the like. However, it is necessary that such aperture 16 increase continuously in diameter from adjacent such face in order to provide for the flow of water, snow, mud, etc., out of the aperture by the force of gravity. It will be understood that if water or other liquids are retained in the aperture 16, such liquids will tend to result in corrosion and other undesirable effects on the body of the vehicle or the like as well as the rope and the device itself.

As noted hereinabove, it is not necessary that aperture 16 extend through flange portion 11. However, it is desirable for reasons of economy. Also, as shown in FIG. 4, the distance X between the inner surface 29 of lip member 17 and the face 12 of mount 10 (or face 26 of the mount 27 of FIG. 3) is related generally to the thickness of rope 19. That is, the distance X is such that lip member 17 is spaced above the face 12 a sufficient distance to accept the loop portion 18 of rope 19. For example, with the dimensions for mount 10 given above, this distance is about three-eighths inch or so. The plane of surface 29 is also preferably generally parallel to the plane of face 12. This would take care of ropes up to three-eighths inch or so in diameter. The average diameter of rope used for such purposes is generally about one-half inch or so. Of course, distance X could be greater with the dimensions of mount 10 changed accordingly to provide for ropes of even greater diameter.

It is noted that I use the term "rope" in a broad sense and thus include all ropes of whatever material, such as wire, hemp, etc., and chains or any similar restraining devices. Further, my mounts may be made of any suitable material, such as aluminum, steel, etc. Also, as indicated above, they may be made of separable parts secured together in any suitable manner. However, preferably, for reasons of economy and ease of manufacture, my mounts are cast as a unitary piece from any suitable material, such as aluminum.

As can be seen from the foregoing, I have described a rope hook mount for a vehicle or the like which can be used to secure cargo or the like without any parts thereof protruding outwardly therefrom so that the smooth contour of the panel or other body portion of the vehicle upon which it is mounted is preserved to the maximum extent possible with minimum modification of such panel or other body portion. Thus, there is no obstruction which can engage the cargo or workmen using my mounts. The mounts are generally flush with the surface upon which they are mounted and present a streamlined appearance thereto. Finally, I have accomplished the above without the necessity of forming relatively large holes in the vehicle body. Thus, my mounts can be later removed, if desired, without leaving such holes.

I claim as my invention:

1. A rope hook mount for attachment to a generally vertical portion of the body of a vehicle or the like comprising: a unitary device of rigid material, said device being circular and generally planar with opposed major faces and a given maximum cross-sectional diameter, one of said major faces conforming to the contour of said portion of the body of the vehicle or the like to which said device is to be attached and the other of said major faces forming part of a given smoothly convex surface having a radius of curvature at least about equal to said given cross-sectional diameter, said device having a generally circular aperture of continuously increasing diameter extending from adjacent said one major surface toward said other major surface normally thereto, said aperture being interrupted adjacent said other major surface to leave intact a portion of said other major surface extending radially from about the center of said aperture to the periphery of said aperture providing an elongated integral lip member having said radius of curvature spaced from said one major surface of said device whereby a rope may be hooked about said lip member with no portion of said other major surface including said lip member projecting beyond said given smoothly curved convex surface, and means for attaching said device to said portion of the body of the vehicle or the like.

* * * * *